US012803677B2

(12) United States Patent
Comin et al.

(10) Patent No.: US 12,803,677 B2
(45) Date of Patent: Nov. 17, 2026

(54) OPTICAL TRANSMITTER, OPTICAL RECEIVER, OPTICAL SYSTEM AND METHOD FOR QUANTUM COMMUNICATION

(71) Applicant: Airbus SAS, Blagnac (FR)

(72) Inventors: Alberto Comin, Blagnac (FR); Ricardo Barrios, Blagnac (FR)

(73) Assignee: Airbus SAS, Blagnac (FR)

( * ) Notice: Subject to any disclaimer, the term of this patent is extended or adjusted under 35 U.S.C. 154(b) by 407 days.

(21) Appl. No.: 18/529,246

(22) Filed: Dec. 5, 2023

(65) Prior Publication Data

US 2024/0204882 A1 Jun. 20, 2024

(30) Foreign Application Priority Data

Dec. 16, 2022 (EP) .................................... 22214397

(51) Int. Cl.

*H04B 10/69* (2013.01)
*H04B 10/112* (2013.01)
*H04B 10/508* (2013.01)
*H04B 10/54* (2013.01)

(52) U.S. Cl.

CPC ....... *H04B 10/6972* (2013.01); *H04B 10/112* (2013.01); *H04B 10/508* (2013.01); *H04B 10/541* (2013.01)

(58) Field of Classification Search

CPC ..... H04B 10/508; H04B 10/541; H04B 10/70
See application file for complete search history.

(56) References Cited

U.S. PATENT DOCUMENTS

| | | | | |
|---|---|---|---|---|
| 10,341,015 B1 * | 7/2019 | Sarovar | H04B 10/70 |
| 12,155,419 B2 * | 11/2024 | Etcheverry Cabrera | H01S 5/0428 |
| 12,386,236 B1 * | 8/2025 | Ihn | G02F 1/3503 |
| 12,562,818 B2 * | 2/2026 | Miller | H04B 10/11 |
| 2003/0231771 A1 * | 12/2003 | Gisin | H04L 9/0852 380/255 |

(Continued)

FOREIGN PATENT DOCUMENTS

CN 111130779 A 5/2020

OTHER PUBLICATIONS

European Search Report for corresponding European Application No. 22214397 dated Jun. 2, 2023; priority document.

(Continued)

*Primary Examiner* — Tanya T Motsinger
(74) *Attorney, Agent, or Firm* — Greer, Burns & Crain, Ltd.

(57) ABSTRACT

An optical transmitter for quantum communication, including a QKD channel comprising at least QKD light source and configured to emit a stream of QKD encoded pulses; a reference channel including a reference light source and configured to emit a stream of reference pulses; and a control circuit connected to the QKD channel and to the reference light channel. The control circuit is configured to control the QKD channel and the reference light channel to emit the reference pulses with a predetermined time delay to the QKD encoded pulses. A difference of a wavelength of the QKD encoded pulses and a wavelength of the reference pulses is 5 nm or less. A corresponding optical receiver, an optical system and a method for quantum communication are also provided.

16 Claims, 8 Drawing Sheets

(56) References Cited

U.S. PATENT DOCUMENTS

| | | | | |
|---|---|---|---|---|
| 2004/0109631 | A1* | 6/2004 | Franson | B82Y 10/00 385/15 |
| 2005/0047601 | A1* | 3/2005 | Shields | H04B 10/70 380/283 |
| 2005/0190921 | A1* | 9/2005 | Schlafer | H04L 9/0858 380/278 |
| 2006/0018475 | A1* | 1/2006 | Vig | H04L 9/0852 380/256 |
| 2007/0258592 | A1* | 11/2007 | Mitchell | H04L 9/0852 380/259 |
| 2008/0292102 | A1* | 11/2008 | Wang | H04L 9/0852 380/256 |
| 2009/0022322 | A1* | 1/2009 | Trifonov | H04B 10/70 380/278 |
| 2009/0106553 | A1* | 4/2009 | Wang | A63B 22/0605 713/168 |
| 2011/0280405 | A1* | 11/2011 | Habif | H04B 10/70 380/278 |
| 2013/0101119 | A1* | 4/2013 | Nordholt | H04L 9/0852 380/278 |
| 2015/0372768 | A1* | 12/2015 | Dynes | H04B 10/70 398/188 |
| 2019/0199523 | A1* | 6/2019 | Alleaume | H04L 9/0852 |
| 2020/0044750 | A1* | 2/2020 | Cai | H04B 10/70 |
| 2020/0169397 | A1* | 5/2020 | Li | H04B 10/524 |
| 2022/0029798 | A1* | 1/2022 | Guo | H04B 10/70 |
| 2023/0020193 | A1* | 1/2023 | Williams | H04L 9/0825 |
| 2023/0393335 | A1* | 12/2023 | Challener | H04L 9/0852 |
| 2024/0039641 | A1* | 2/2024 | Kim | H04B 10/2575 |
| 2024/0171287 | A1* | 5/2024 | Ghasemi | H04B 10/6165 |
| 2024/0419404 | A1* | 12/2024 | Burchard | H04B 10/70 |
| 2025/0023556 | A1* | 1/2025 | Yune | H03K 5/133 |
| 2025/0023720 | A1* | 1/2025 | Lim | H04L 9/0852 |
| 2025/0274272 | A1* | 8/2025 | Kolenderski | H04L 9/0858 |
| 2026/0052004 | A1* | 2/2026 | Livneh | H04L 7/0008 |

OTHER PUBLICATIONS

M. Li, et al., "Optimized Coherent State Based Quantum Cryptography with High Robust for Networks Deployment" IEEE Access, vol. 7, Aug. 21, 2019; pp. 109628-109634.

S. P. Kish et al., "Use of a Local Local Oscillator for the Satellite-to-Earth Channel" ARXIV.org, Cornell University Library, Ithaca, NY, Oct. 19, 2020.

* cited by examiner

OPTICAL TRANSMITTER, OPTICAL RECEIVER, OPTICAL SYSTEM AND METHOD FOR QUANTUM COMMUNICATION

CROSS-REFERENCES TO RELATED APPLICATIONS

This application claims the benefit of the European patent application No. 22214397.6 filed on Dec. 16, 2022, the entire disclosures of which are incorporated herein by way of reference.

FIELD OF THE INVENTION

The present invention relates to an optical transmitter for quantum communication, an optical receiver, a system and a method for quantum communication.

BACKGROUND OF THE INVENTION

In order to establish long-distance secure communication links, it is expected that in the near future an important application of quantum communication will be free-space quantum key distribution (QKD) over an air-ground link or a space-ground QKD link. In these channels, atmospheric turbulences distort the wavefront of optical beams including those used for quantum communication. Since it is not possible to amplify quantum signals, a setup for free-space QKD requires a large telescope for receiving the signal. However, when the diameter of the telescope becomes larger than the coherence length of the wavefront, the so-called Fried parameter, the telescope cannot efficiently focus the received light. Therefore, distortions of the wavefront of a QKD link are even more severe than for a classical communication link.

For these systems, there is a need to correct the wavefront of a beam in the QKD link in an efficient way.

SUMMARY OF THE INVENTION

According to a first aspect of the invention, an optical transmitter for quantum communication is provided. The optical transmitter comprises a QKD channel comprising at least QKD light source and configured to emit a stream of QKD encoded pulses; a reference channel comprising a reference light source and configured to emit a stream of reference pulses; and a control circuit connected to the QKD channel and to the reference light channel, wherein the control circuit is configured to control the QKD channel and the reference light channel to emit the reference pulses with a predetermined time delay to the QKD encoded pulses, wherein a difference of a wavelength of the QKD encoded pulses and a wavelength of the reference pulses is 5 nm or less.

According to a second aspect of the invention, an optical receiver for quantum communication is provided. The optical receiver comprises a detection unit containing one or more photon counters arranged and configured to detect QKD encoded pulses emitted by an optical transmitter, in particular by the optical transmitter according to the preceding claims; a wavefront sensor arranged to receive reference pulses emitted by an optical transmitter, in particular by the optical transmitter, and configured to measure a wavefront of the reference pulses to provide a wavefront signal; an adaptive optical element arranged upstream of the detection unit and configured to manipulate a wavefront of the QKD encoded pulses; and a receiver controller connected to the wavefront sensor, the adaptive optical element and the detection unit, wherein the receiver controller is configured to: apply a time gate to the one or more photon counters in the detection unit at the time of arrival of the QKD encoded pulses; obtain the wavefront signal indicating the measured wavefront of the reference pulses; and trigger the adaptive optical element to correct the wavefront of the QKD encoded pulses based on the wavefront signal.

According to a third aspect of the invention, an optical system for quantum communication is provided. The optical system comprises an optical transmitter according to the invention, and an optical receiver according to the invention.

According to a fourth aspect of the invention, a method for quantum communication is provided. The method comprises emitting, by an optical transmitter, a stream of QKD encoded pulses and reference pulses, wherein the reference pulses are emitted with a predetermined time delay relative to the QKD encoded pulses, wherein a difference of a wavelength of the QKD encoded pulses and a wavelength of the reference pulses is 5 nm or less; measuring, by a wavefront sensor, the wavefront of the reference pulses; applying, based on the measured wavefront, a wavefront correction to the QKD encoded pulses by an adaptive optical element; and obtaining, by a detection unit containing one or more photon counters, the QKD encoded pulses by applying a time gate based on a time of arrival of the QKD encoded pulses at the one or more photon counters in the detection unit for temporally filtering the QKD encoded pulses from the reference pulses.

A fundamental concept of the invention is to use the very small duty cycle, i.e., the time period between two successive QKD encoded pulses, to emit a reference pulse in between. The reference pulse has much more energy than a QKD encoded pulse. It is therefore easier to measure the wavefront of the reference pulses than directly measure the wavefront of the QKD encoded pulses. Having a corrected wavefront, the QKD encoded pulses can be better focused on the photon counter, which then reduces the Qubit error rate (QBER) and thus improves the data rate.

In order to temporarily place a reference pulse between two successive QKD encoded pulses, a predetermined time delay is applied between the reference pulses and the preceding QKD encoded pulses. For this, the repetition rate of the reference pulses is the same or a multiple of the repetition rate of the QKD encoded pulses. Since the duty cycle of the QKD stream comprising the QKD encoded pulse is very small, e.g., 100 ps (picosecond) pulses every 10 ns (nanoseconds), i.e., about 1%, the predetermined time delay may be relatively large. This allows the two different pulses to be discriminated with a high degree in the time domain.

The control circuit generates the predetermined time delay that is applied to the reference pulses. The controller thus has some sort of time base that is used to generate electric pulses that are split according to the number of the light sources in the transmitter. A delay line or circuit within the controller may be applied to generate the predetermined time delay or time shift of the electric pulses prior to their arrival at the respective light source.

At the receiver, the reference pulses can easily be analyzed by a wavefront sensor, which can be a Shack-Hartmann sensor or any other suitable sensor. The measured wavefront is corrected by an adaptive optical element, which can be a deformable mirror, a spatial light modulator or any other device suitable for this task.

A particular advantage in the solution according to an aspect of the invention is that by measuring the wavefront of the reference pulses, measurement at the same wavelength of the QKD signal, i.e., the QKD encoded pulses, becomes possible with this scheme. By transmitting the pulses through the same communication channel, this scheme ensures a close to optimal wavefront correction.

Furthermore, since the reference pulses are emitted in a similar amount as the QKD encoded pulses, this scheme advantageously allows for quickly measure changes of wavefront of the QKD encoded pulses. Therefore, it is possible to quickly adapt the wavefront of the QKD encoded pulses thus taking into account changes in the atmospheric path of the QKD channel, which is regularly occurring, e.g., in a space/air-to-ground link.

As within this application, a QKD encoded pulse is a pulse intended and suitable for quantum communication, typically containing on average less than one photon and carrying information in the form of a quantum state. Classically, such a quantum state may be polarization. In the most common BB84 scheme, polarization states of 0°, 90°, +45° and −45° are used. However, other quantum states such as, e.g., the orbital angular momentum, and other QKD schemes, such as the E91 scheme or decoy states may be applied to the QKD encoded pulses within this invention.

According to some further aspects of the optical transmitter according to the invention, the control circuit comprises a pulse generator, wherein the control circuit is configured to drive the reference light source by pulses generated by the pulse generator. The light source is configured to convert the electrical pulses into optical pulses. This may be achieved using a common laser diode, DFB laser diode, VCSEL, or other lasers allowing such pulsed operation mode. This represents a simple implementation to generate the reference pulses.

According to some further aspects of the optical transmitter according to the invention, the optical transmitter further comprises an amplitude modulator connected to the control circuit. Such an amplitude modulator may, e.g., be a Mach-Zehnder based modulator having an optical delay that is controlled by the control circuit. The reference light source is configured as a cw (continuous wave) light source. This allows an employment of a cw light source, such as a diode laser, or another laser, such as a gas laser. The amplitude modulator is arranged in the reference channel downstream of the reference light source. The amplitude modulator is configured to modulate emitted cw light of the reference light source to generate the reference pulses. In this way, the reference pulses may be generated in a flexible and efficient way.

According to some further aspects of the optical transmitter according to the invention, the control circuit comprises a reference delay line configured to delay an electric signal to the reference channel to generate the predetermined time delay. The reference delay line is connected to the reference channel and enables the accurate generation of the predetermined time delay between the QKD encoded pulses and the reference pulses.

According to some further aspects of the optical transmitter according to the invention, the optical transmitter further comprises a spatial mode converter, which is configured to modulate a spatial mode of the QKD encoded pulses and/or the reference pulses. Such a spatial mode converter could be a phase mask or a spatial light modulator, e.g., based on liquid crystals. This allows further discrimination of the reference pulses from the QKD encoded pulses, thus avoiding crosstalk between the reference channel and the QKD channel.

According to some further aspects of the optical transmitter according to the invention, the optical transmitter further comprises combiner optics arranged and configured to combine the QKD encoded pulses and the reference pulses to a combined output beam. This combining may be realized by a beam splitter or by fiber optics employing a waveguide coupler. This allows the reference pulses to propagate exactly on the same path as the QKD encoded pulses. In this way, a wavefront measurement of the reference pulses allows to correct the wavefront of the QKD encoded pulses with improved, i.e., high, quality.

According to some further aspects of the optical transmitter according to the invention, the QKD channel comprises a plurality of QKD light sources, which are configured as single photon sources, wherein the QKD light sources preferably are configured as VCSELs. This allows having a high data rate of the QKD channel, thus also a high repetition rate of the reference pulses and allows, with a suitable receiver, to quickly adapt their wavefronts.

According to some further aspects of the optical transmitter according to the invention, the control circuit comprises a QKD delay line for each of the QKD light sources, wherein the control circuit is configured to trigger the plurality of QKD light sources to substantially emit QKD encoded pulses simultaneously. This avoids a time jitter within the QKD encoded pulses, thereby preventing or at least reducing crosstalk between the reference pulses and the QKD encoded pulses. The QKD delay line further ensures that all the QKD light sources emit at the same time with respect to the time base. This ensures that an eavesdropper cannot understand which light source has emitted a QKD encoded pulse or photon, by observing its arrival time with respect to the time base.

According to some aspects of the optical transmitter according to the invention, the predetermined time delay is approximately half of the time period of two successive QKD encoded pulses. The exact time delay might be longer than half of the time period, to take into account the asymmetry of the electrical pulses generated by the photon counters, e.g., the tail of the pulse is typically longer than the rise time. This predetermined time delay represents the optimum predetermined time delay for discriminating or separating the reference pulse from the QKD encoded pulses since the temporal distance is at maximum. Therefore, crosstalk between the reference channel and the QKD channel is reduced.

According to some further aspects of the optical transmitter according to the invention, the control circuit comprises an internal clock, wherein the internal clock is configured to provide a time base for the predetermined time delay of the reference pulse to the preceding QKD encoded pulses. This ensures an accurate time delay, thus avoiding a crosstalk between the QKD channel and the reference channel. It further provides a local time base, which enables independency of external time bases. Alternatively, a time base can be provided by an external clock, for example, derived from an atomic clock, or it could be extracted from an According to some further aspects of the optical receiver according to the invention, the optical receiver further comprises a dichroic filter. The dichroic filter is arranged and configured to substantially spectrally filter, i.e., separate, the QKD encoded pulses from the reference pulses, when a difference between the wavelength of the QKD encoded pulses and the wavelength of the reference pulses is between 1 nm and 5 nm. Thus, the dichroic filter is able to substantially discriminate the reference pulses and the QKD encoded pulses in case they have a wavelength difference between 1 nm and 5 nm. Preferably, this difference is between 2 nm and 3 nm. In addition to the time gating, this further reduces crosstalk and improves the isolation of the pulses at the receiver side.

According to some further aspects of the optical receiver according to the invention, the adaptive optical element is arranged upstream of the wavefront sensor and configured to manipulate the wavefront of the reference pulses. The receiver controller is configured to correct a spatial mode of the reference pulses based on the measured wavefront. This allows the application of higher spatial modes to the reference pulses. The higher spatial mode can then be spatially filtered by a demultiplexer, e.g., a phase plate, from the QKD encoded pulses. This further improves the isolation of the reference pulses from the QKD encoded pulses.

BRIEF DESCRIPTION OF THE DRAWINGS

The present invention is explained in more detail below with reference to the embodiments shown in the schematic figures.

Figure 1:
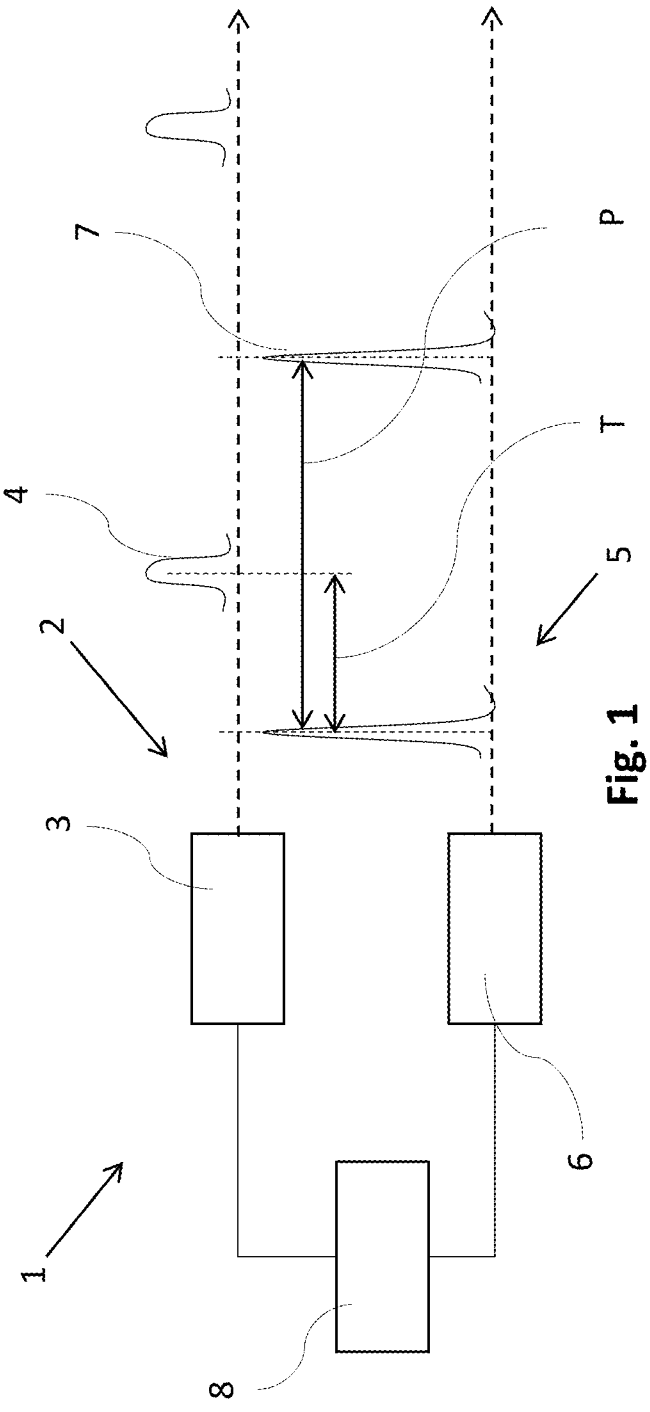
FIG. 1 shows a schematic illustration of an optical transmitter for quantum communication according to an embodiment of the invention.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

FIG. 1 shows a schematic illustration of an optical transmitter 1 for quantum communication according to an embodiment of the invention.

The optical transmitter 1 shown in FIG. 1 is an optical transmitter 1 for quantum communication. The optical transmitter 1 comprises a QKD channel 2 and a reference channel 5. The QKD channel 2 is configured as a quantum communication channel using Quantum Key Distribution, QKD. The QKD channel 2 comprises at least one QKD light source 3 and is configured to emit a stream of QKD encoded pulses 4. In this embodiment, the QKD light sources 3 are configured as a single photon source emitting, on average, less than one photon per pulse. The reference channel 5 comprises a reference light source 6 and is configured to emit a stream of reference pulses 7. The QKD channel 2 and the reference channel 5 are configured to emit QKD encoded pulses 4 and reference pulses 7, which are directed in a parallel direction.

The optical transmitter 1 further comprises a control circuit 8, which is connected to the QKD channel 2 and to the reference light channel 5, more concretely to the respective QKD light source 3 and the reference light source 6. The control circuit 8 is configured to control the QKD channel 2 and the reference channel 5 to emit the reference pulses 7 with a predetermined time delay T to the preceding QKD encoded pulses 4. Although in FIG. 1, the time delay T shows a distance between a QKD encoded pulse 4 and the successive a reference pulse 7, it can be understood that the pulse distance in FIG. 1 relates to the delay time T by the speed of light (i.e., about 3*108 m/s in vacuum). Since FIG. 1 is a schematic drawing, a scale indicating the value of the emission frequency or the repetition rate of the pulses cannot be derived from FIG. 1.

A difference of a wavelength of the QKD encoded pulses 4 and a wavelength of the reference pulses 7 is 5 nm or less. Therefore, the wavelength of the two pulses is very close. Optionally, the wavelength of the QKD encoded pulses 4 and a wavelength of the reference pulses 7 are substantially the same, i.e., less than 5 nm. In this way, the reference pulse 7 approximately experiences the same distortions when propagating through the atmospheric turbulence, as described further below.

In the embodiment shown in FIG. 1, the QKD encoded pulses 4 and the reference pulse 7 are not combined and transmitted separately through different apertures (not shown). In further embodiments as described below, the QKD channel 2 and the reference channel 5 are combined prior to transmitting a combined beam through a single aperture.

Figure 2:
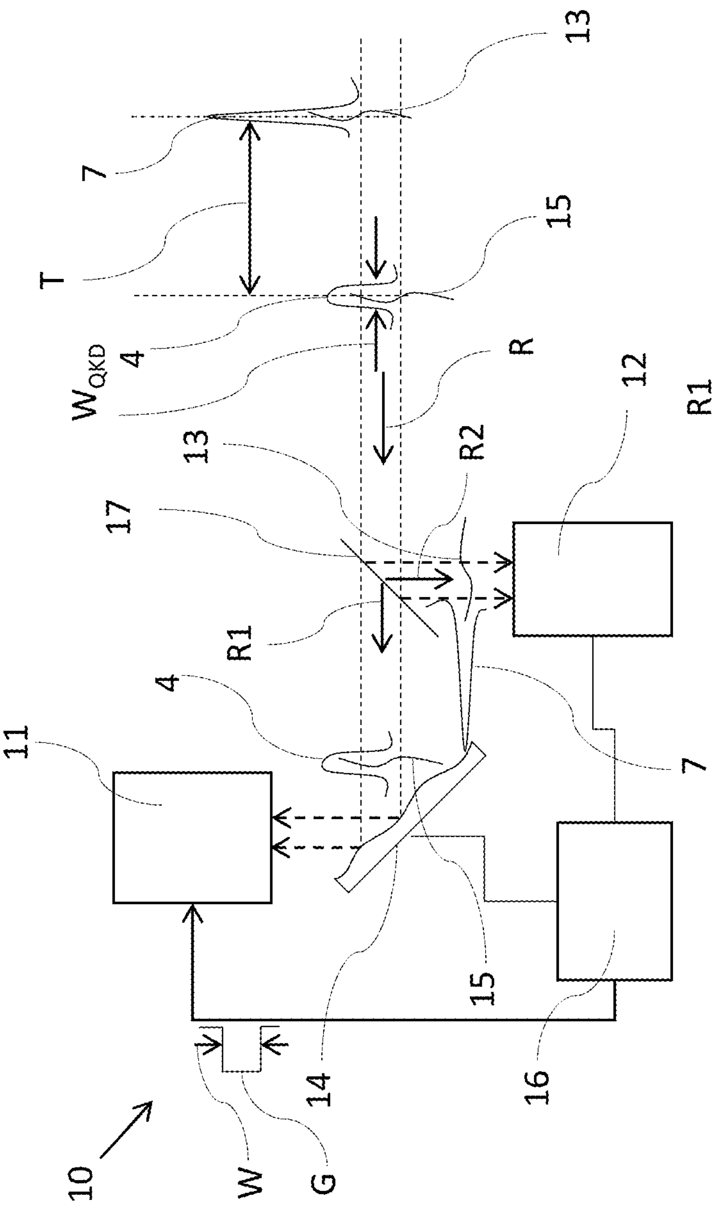
FIG. 2 shows a schematic illustration of an optical receiver for quantum communication according to an embodiment of the invention.

FIG. 2 shows a schematic illustration of an optical receiver 10 for quantum communication according to an embodiment of the invention.

FIG. 2 shows an optical receiver 10 for quantum communication. The optical receiver 10 comprises a detection unit 11 containing one or more photon counters arranged and configured to detect QKD encoded pulses 4. The photon detection unit 11 may comprise one or more photon-counter, and the optics required to split the photons of the QKD encoded pulses 4 based on their state, e.g., their polarization. The photon detection unit 11 may also contain optics to correct the polarization state of the photons, e.g., waveplates. The optics inside the photon detection unit 11 might be discrete optical components or they might be implemented as a photonic chip, e.g., a photonic integrated chip (PIC). In the case of the BB84 scheme, the detection unit 11 contains four photon counters arranged using three beam splitter and a half waveplate to detect four different linear polarization states (horizontal 0°, vertical 90°, plus +45°, minus −45°). The optical receiver 10 further comprises a wavefront sensor 12, which is arranged to receive reference pulses 7. The wavefront sensor 12 is a Shack-Hartmann sensor in this embodiment. The wavefront sensor 12 is configured to measure a wavefront 13 of the reference pulses 7 incident on the wavefront sensor 12 to provide a wavefront signal. The separation of the pulses 4, 7 is performed by a dichroic filter 17, which separates a common receiver channel R into a first receiver channel R1 directed to the detection unit 11 and a second receiver channel R2 directed to the wavefront sensor 12. In the ideal case, the QKD encoded pulses 4 propagate on the first receiver channel R1 and the reference pulses 7 on the second receiver channel R2. In the present embodiment, a difference between the wavelength of the QKD encoded pulses 4 and the wavelength of the reference pulses 7 is larger than about 1 nm, e.g., between 1 nm and 5 nm, preferably between 2 nm and 3 nm. In this case, the dichroic filter 17 is arranged and configured to substantially filter the QKD encoded pulses 4 from the reference pulses 7 by spectral separation. This can be achieved, e.g., by a notch filter or a narrow band-pass filter, which are commercially available items.

In further embodiments, the wavelength of the QKD encoded pulses 4 and the reference pulses 7 are substantially the same. In this case, instead of the dichroic filter 17, a beam splitter may be employed.

The optical receiver 10 further comprises an adaptive optical element 14, which is arranged upstream of the detection unit 11 containing one or more photon counters and configured to manipulate the wavefront 15 of the QKD encoded pulses 4. The measured wavefront 13 of the reference pulses 7 is thus corrected by the adaptive optical element 14, which is configured as a deformable mirror in this embodiment. In further embodiments, a spatial light modulator is applied for this task.

Not shown in FIG. 2 is an aperture arranged on the common receiver channel R1 and configured to receive QKD encoded pulses 4 and reference pulses 7 emitted by an optical transmitter 1, in particular by an optical transmitter 1, described above.

The optical receiver 10 comprises a receiver controller 16, which is connected to the wavefront sensor 12, the adaptive optical element 14 and the detection unit 11. The receiver controller 16 is configured to apply a time gate G to the one or more photon counters inside the detection unit 11 at the time of arrival of the QKD encoded pulses 4. The time gate G can be configured as a gain switch in the photon counter inside the detection unit 11 such that it is only capable to detect and count an incident photon during the time of the applied time gate G. Data about the QKD encoded pulses 4 are thus collected only during the application of the time gate G. Such time gate G has a width W, which is larger than a pulse width WQKD of the QKD encoded pulses 4. The time gate G is applied periodically to the one or more photon counters according to the repetition rate of the QKD encoded pulses 4.

The receiver controller 16 is further configured to obtain a wavefront signal indicating the measured wavefront 13 of the reference pulses 7. The related data of the wavefront 13 of the reference pulses 7 are thus provided by the wavefront sensor 12 and transmitted to the receiver controller 16.

The receiver controller 16 is further configured to trigger the adaptive optical element 14 to correct the wavefront 15 of the QKD encoded pulses 4 based on the wavefront signal. Having a corrected wavefront, the QKD encoded pulses 4 can be better focused on the photon counters inside the detection unit 11, which reduces the Qubit error rate (QBER) and thus improves the data rate.

Figure 3:
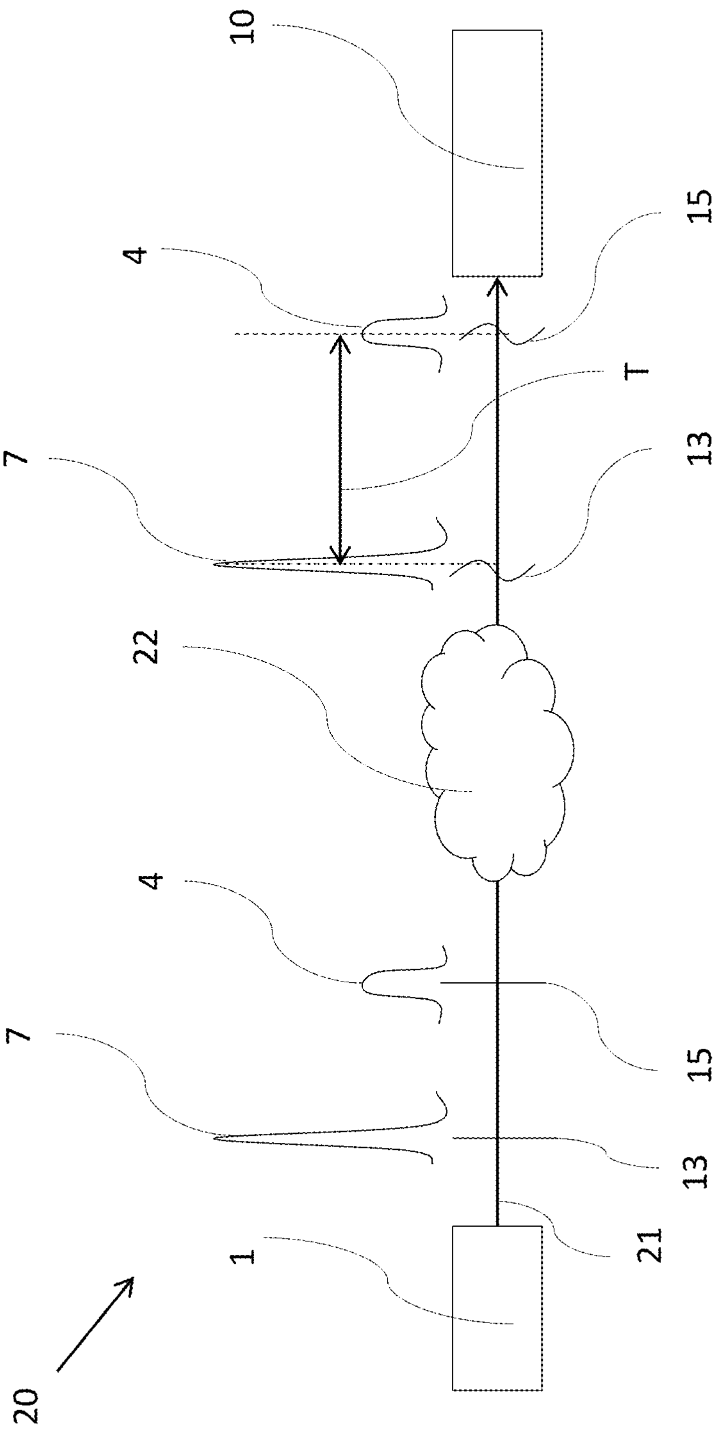
FIG. 3 shows a schematic illustration of an optical system for quantum communication comprising an optical transmitter and an optical receiver according to an embodiment of the invention.

FIG. 3 shows a schematic illustration of an optical system 20 for quantum communication comprising an optical transmitter 1 and an optical receiver 10 according to an embodiment of the invention.

The optical system 20 for quantum communication comprises an optical transmitter 1. The shown optical system 20 is compatible with the optical transmitter 1 described above in relation to FIG. 1. The optical system 20 further comprises an optical receiver 10, and is compatible with the optical receiver 10 described above in relation to FIG. 2.

The optical transmitter 1 is arranged and configured to emit an output beam 21 towards the optical receiver 10. The output beam 21 comprises the QKD encoded pulses 4 and the reference pulses 7, which are delayed by a predetermined time delay T to the preceding QKD encoded pulses 4. The optical receiver 10 is arranged and configured to receive the output beam 21 of the optical transmitter 1.

In the optical system 20 shown in FIG. 3, the output beam 21 passes through the atmosphere 22 creating turbulences on the wavefront 13 of the reference pulses 7 and the wavefront 15 of the QKD encoded pulses 4. Initially at the optical transmitter 1, both wavefronts 13, 15 are plane waves. However, after passing through the atmosphere 22, both wavefronts 13, 15 experience distortions that are originated by turbulences in the atmosphere 22 causing refractive index variations due to pressure and/or temperature differences in the air.

Figure 4:
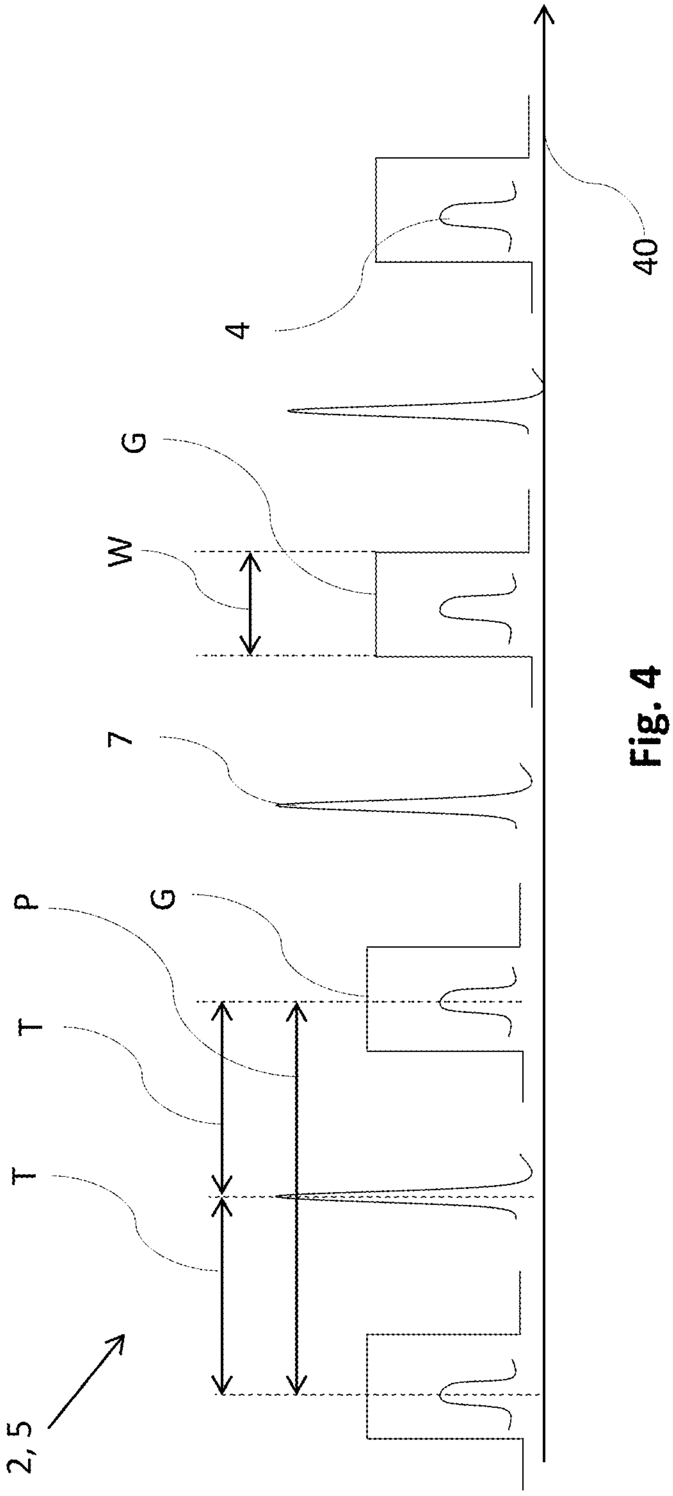
FIG. 4 shows a schematic illustration of a reference channel and a QKD channel for quantum communication according to an embodiment of the invention.

FIG. 4 shows a schematic illustration of a reference channel 5 and a QKD channel 2 for quantum communication according to an embodiment of the invention.

FIG. 4 depicts the QKD encoded pulses 4 in the QKD channel 2 and the reference pulses 7 in the reference channel 5 on a time/distance axis 40. Although the axis 40 relates to a physical distance, since the pulses 4, 7 are emitted constantly with the same repetition rate, axis 40 can also be regarded as a time axis as it is proportional to the distance, by introducing the speed of light.

In this embodiment, the predetermined time delay T is approximately half of the time period P of two successive QKD encoded pulses 4. It results that the predetermined time delay T from a QKD encoded pulse 4 to a preceding reference pulse 7 is similar to the predetermined time delay T from a reference pulse 7 to a preceding QKD encoded pulse 4. This ensures the best isolation of the two pulse streams, which is particularly useful at the optical receiver 10, where the pulses 4, 7 are separated. The QKD encoded pulses 4 are covered by the time gate G that has a width W, which substantially covers to entire a QKD encoded pulse 4. A detector, such as the one or more photon counters in the detection unit 11, is gain switched such that a gain is high at the time when the gate is "open" at the arrival of the QKD encoded pulse 4.

Figure 5:
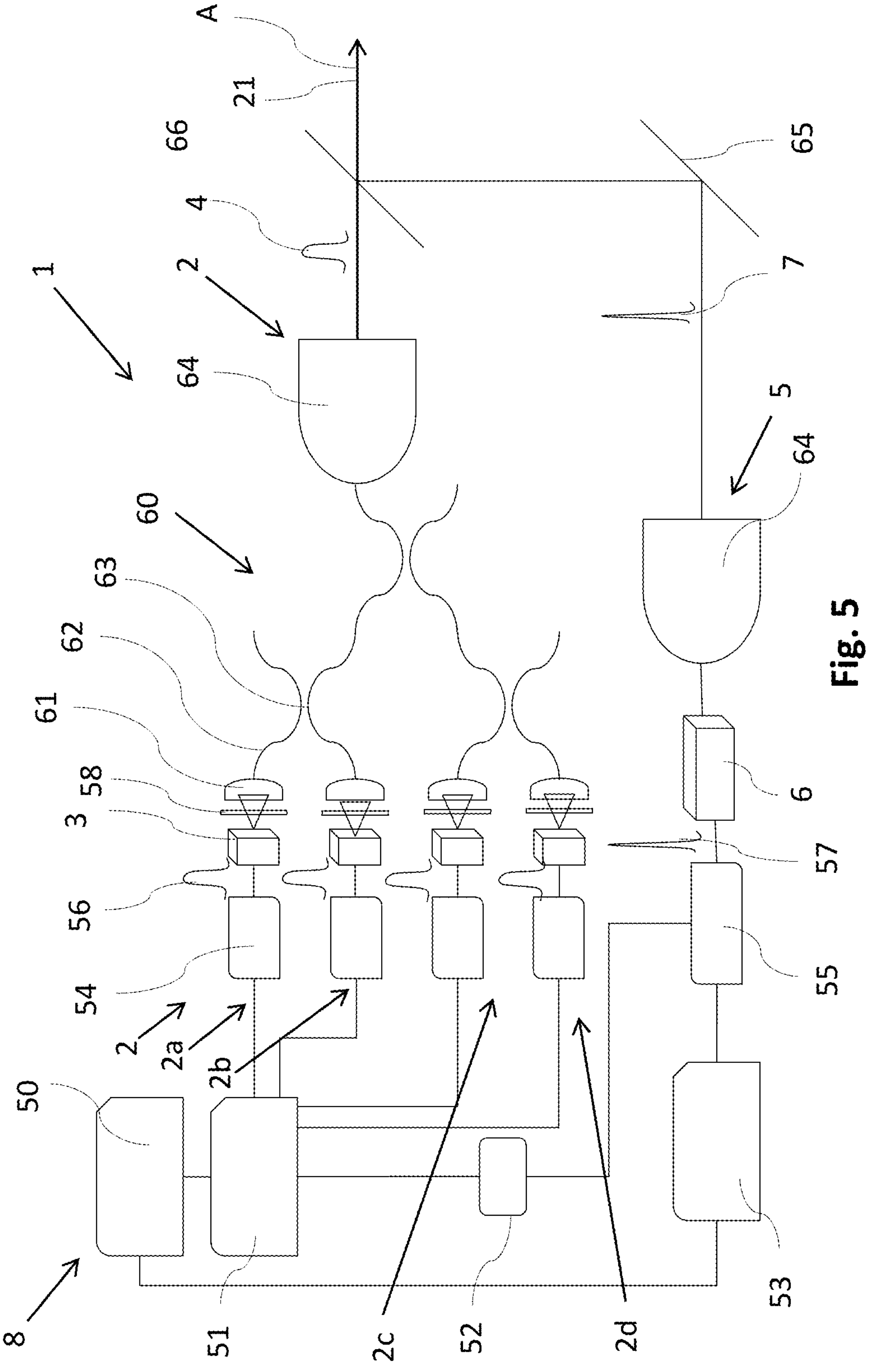
FIG. 5 shows a schematic illustration of an optical transmitter for quantum communication according to a further embodiment of the invention.

FIG. 5 shows a schematic illustration of an optical transmitter 1 for quantum communication according to a further embodiment of the invention.

In the embodiment of FIG. 5, the QKD channel 2 of the optical transmitter 1 comprises four QKD light sources 3 arranged in four QKD subchannels 2*a*, 2*b*, 2*c*, 2*d*. The QKD light sources 3 are configured as single photon sources, and configured to emit in average less than one photon per pulse, e.g., 0.5 photons per pulse. The QKD light sources 3 are configured as VCSELs, thus being possible to function as a single photon source. In further embodiments, the QKD light sources 3 are configured as other types of laser diode.

In this embodiment, the control circuit 8 comprises a power supply 50 to power the electronic devices such as the light sources 3, 6. The control circuit 8 comprises a pulse generator 51, which is connected to the power supply 50. The pulse generator 51 is configured as a current pulse generator 51 for generating current pulses that are used in this embodiment to drive the QKD light sources 3 and the reference light source 6. In further embodiments, the pulse generator 51 is configured as voltage pulse generator 51 and an additional circuit is used to convert the voltage pulse to a current pulse to drive the light sources 3, 6.

For driving the QKD light sources 3 by pulses generated by the pulse generator 51, the control circuit 8 comprises a QKD delay line 54, which is connected to the pulse generator 51 and to the QKD light sources 3 in each QKD subchannel 2*a*, 2*b*, 3*c*, 2*d*. The QKD delay lines 54 are configured to generate a time delay to each generated pulse of the pulse generator 51. By triggering a pulse generation in the pulse generator 51, the plurality of QKD light sources 3 can substantially emit QKD encoded pulses 4 simultaneously. It is understood that only the relevant QKD light source/s 3 are switched on depending on the encoded information.

A synchronized current pulse 56 is depicted downstream the QKD delay line 54 in each of the QKD channels 2*a*, 2*b*, 2*c*, 2*d*. These synchronized current pulses 56 drives the respective QKD light source 3 to emit a pulse simultaneously.

In this embodiment, a polarizer 58 is used to encode information on the pulses emitted by the QKD light source 3 after their emission. The polarizer 58 is configured as a micro polarizer. In this setup, fiber optics 60 are used to combine the four QKD channels 2*a-d* by using fiber coupling optics 61 for coupling the QKD encoded pulses 4 into an optical fiber 62, which, in this case, is a single mode and polarization maintaining fiber. Fiber couplers 63 are used to combine the QKD encoded pulses 4. A fiber collimator 64 is connected to emit the QKD encoded pulses 4 combined from all four QKD channels 2*a* to 2*d* to free space.

The control circuit 8 comprises an internal clock 52, which is connected to the pulse generator 51. The internal clock 52 is configured to provide a time base for the predetermined time delay T of the reference pulse 7 to the preceding QKD encoded pulses 4. In further embodiments, instead of the internal clock 52 shown in FIGS. 5 and 6, a time base is provided by an external clock, e.g., derived from an atomic clock. The control circuit 8 further comprises a reference delay line 55 connected to the internal clock 52 and in between a driver 53 and the reference light source 6. The driver 53 is configured to drive the reference light source 6.

The reference delay line 55 is configured to delay an electric signal from the internal clock 52 to the reference channel 5 to generate the predetermined time delay T to be applied to the reference light channel 5. This reference delay line 55 may generally be less accurate than the QKD delay lines 54 used for the QKD channel 2.

A current reference pulse 57 is shown in FIG. 5. The reference light 6 in FIG. 5 is a fiber coupled light source. The reference pulses 7 emitted by the reference light source 6 are collimated into free space by a fiber collimator 64 arranged in the reference channel 5.

The emitted reference pulse 7 is first directed to a mirror 65 where it is redirected to combiner optics 66. The combiner optics 66 is arranged and configured to combine the QKD encoded pulses 4 emitted on the QKD channel 2 and the reference pulses 7 emitted on the reference channel 5 to a combined output beam 21 using a beam combiner 66. By this beam combining, the QKD encoded pulses 4 and the reference pulses 7 are directed substantially in the same direction to propagate on a common optical axis A. In this embodiment, the beam combiner 66 is a regular beam splitter or half-mirror. In further embodiments, the beam combiner 66 is configured as a dichroic mirror 17 with a sharp spectral edge on reflection/transmission between the wavelength of the QKD encoded pulses 4 and the reference pulses 7. In further embodiments, the combination of the QKD channel 2 and the reference channel 5 is performed by fiber optics 60 employing fiber couplers 63. In such embodiments, the entire optical setup may be performed by fiber optics. In further embodiments, the QKD encoded pulses 4 and the reference pulses 7 are transmitted through separate apertures as in the embodiment shown in FIG. 1.

In the above embodiments, we refer to fiber optics 60 for simplicity. It is understood that waveguides inside a photonic chip could also be used, when convenient, to further reduce the size of the optical transmitter 1.

Figure 6:
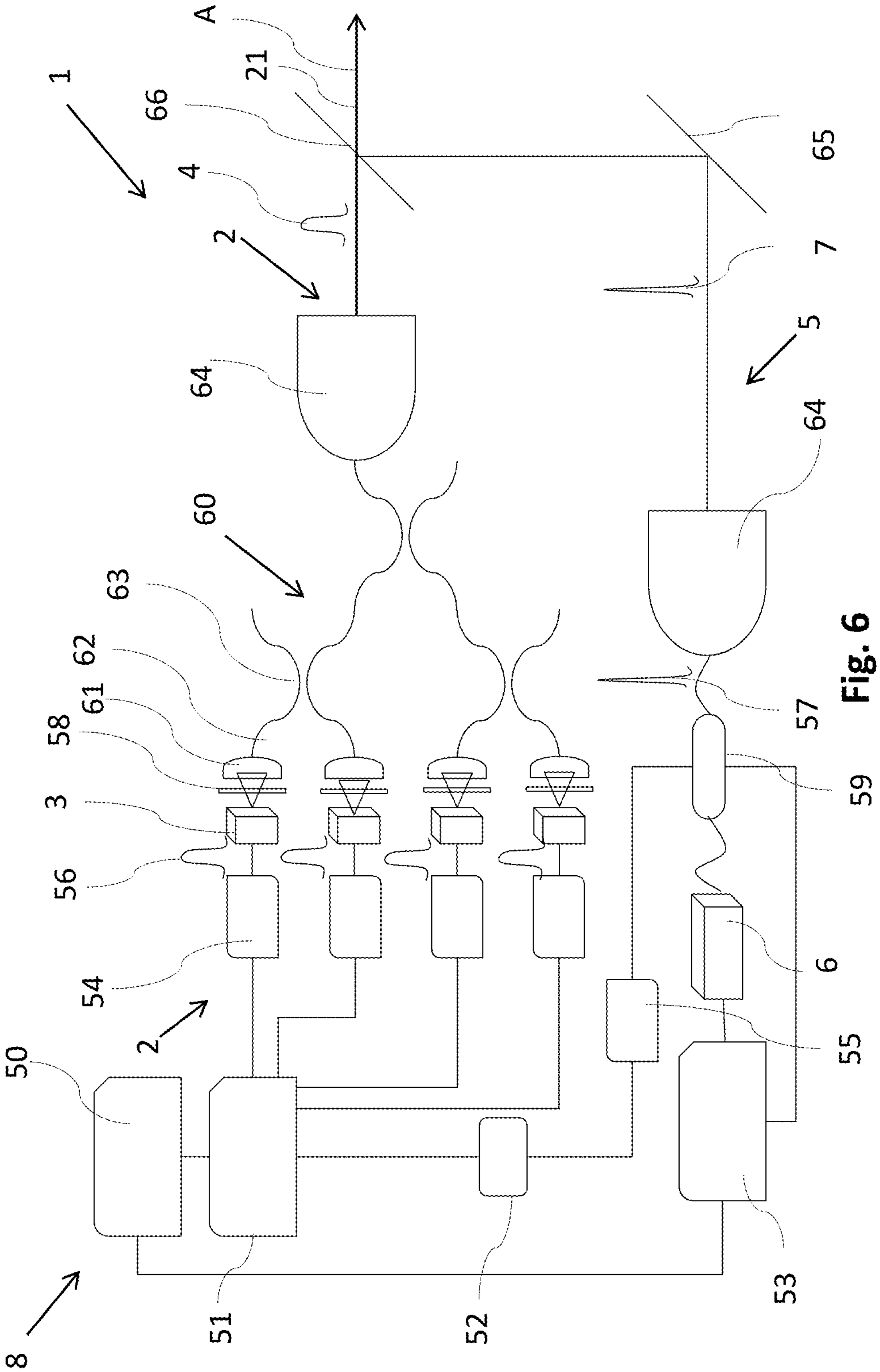
FIG. 6 shows a schematic illustration of an optical transmitter for quantum communication according to a further embodiment of the invention.

FIG. 6 shows a schematic illustration of an optical transmitter 1 for quantum communication according to a further embodiment of the invention.

The embodiment shown in FIG. 6 is based on the embodiment in FIG. 5 and has only a few modifications. In this embodiment, instead of directly driving the reference light source 6 with a time delayed current reference pulse 57, the reference light source 6 is configured as a cw, i.e., continuous wave, light source emitting light with continuous optical power. The optical transmitter 1 further comprises an amplitude modulator 59 connected to the control circuit 8. The amplitude modulator 59 is arranged in the reference channel 5 and configured to modulate emitted light of the reference light source 6 to generate the reference pulses 7. The control circuit 8 comprises a reference delay line 55 configured to generate the predetermined time delay T applied to the reference light channel 5, in this case to the amplitude modulator 59 to generate the reference pulses 7. In this embodiment, the amplitude modulator 59 is a Mach-Zehnder Modulator. In further embodiments, the amplitude modulator 59 may be any different type of modulator suitable for this task.

In FIG. 5 and FIG. 6, the QKD channel 2 and the reference channel 5 are implemented in a single structural unit. In further embodiments, the QKD channel 2 and the reference channel 5 may be implemented as sub-modules, arranged in the same or in two separate housings, connected via cable or wirelessly.

Figure 7:
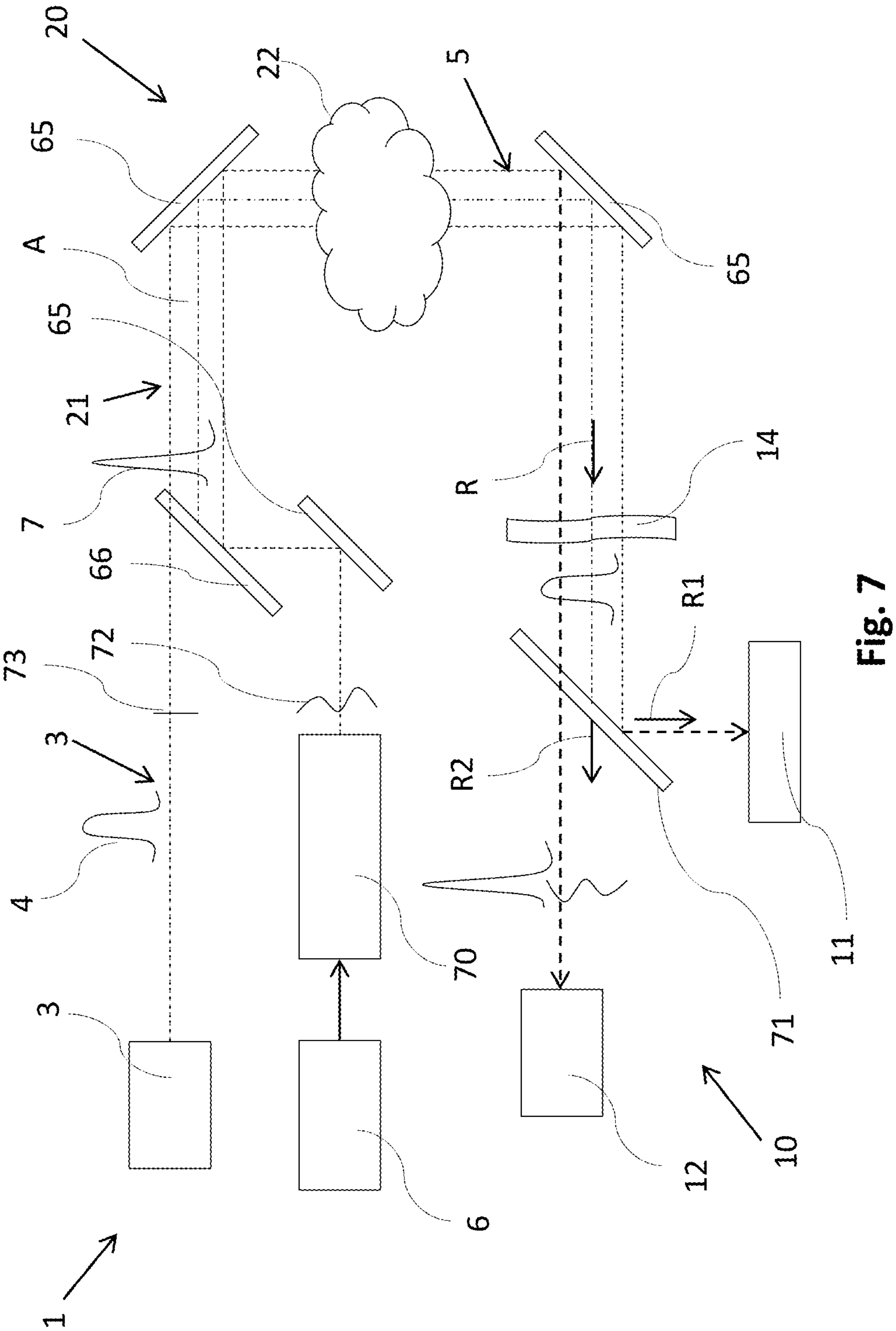
FIG. 7 shows a schematic illustration of an optical system for quantum communication comprising an optical transmitter and an optical receiver according to a further embodiment of the invention.

FIG. 7 shows a schematic illustration of an optical system 20 for quantum communication comprising an optical transmitter 1 and an optical receiver 10 according to a further embodiment of the invention.

The optical system 20 shown in FIG. 7 is based on the previously described embodiments of the invention, in particular, in the optical system 20 shown in FIG. 3. In this embodiment of an optical system 20, the optical transmitter 1 further comprises a spatial mode converter 70 that is configured to modulate a spatial mode 72 of the reference pulses 7 to generate a converted spatial mode 72, which is orthogonal to a spatial mode 73 of the QKD encoded pulses 4. In further embodiments, the spatial mode converter 70 is configured to modulate the spatial mode 73 of the QKD encoded pulses 4. The mode converter could convert a fundamental mode, e.g., a Gaussian mode TEM00 or a L01 mode from a step-index fiber, into a higher order converted spatial mode 72, such as a TEM01 or a LP11 mode.

Similar to the previous embodiments of FIGS. 5 and 6, the optical transmitter 1 comprises a mirror 65 to deflect the reference pulses 7 onto the combiner optics 66 arranged and configured to combine the QKD encoded pulses 4 and the reference pulses 7 to a combined output beam 21. In this case, the QKD encoded pulses 4 and the reference pulses 7 propagate on the same optical axis A but may experience a different divergence due to the different spatial modes.

The optical receiver 10 in this embodiment comprises a spatial demultiplexer 71, which is configured in this embodiment as a phase plate. The spatial demultiplexer 71 is arranged on a receiver channel R and configured to substantially spatially filter the QKD encoded pulses 4 from the reference pulses 7 on respective receiver channels R1 and R2. In this embodiment, the spatial demultiplexer 71 is configured to transmit the converted spatial mode 72 of the reference pulses 7 to the first receiver channel R1 to be incident onto the wavefront sensor 12. The demultiplexer is configured to reflect the spatial mode 73 of the QKD encoded pulses 4 to a second receiver channel R2 to be incident onto the detection unit 11.

The optical receiver 10 comprises an adaptive optical element 14 that is here arranged upstream of the wavefront sensor 12 and configured to manipulate the wavefront 13 of the reference pulses 7. Due to the converted mode of the reference pulses 7, the receiver controller 16 is configured to correct a spatial mode 72 of the reference pulses 7 based on the measured wavefront 13, taking into account the converted mode at the optical transmitter 1. By correcting the wavefront 13 of the receiver pulse 7 towards the converted spatial mode 72 of the reference pulses 7, the wavefront 15 of the QKD encoded pulses 4 is also corrected, thus enabling optimal focusing.

In further embodiments, an additional dichroic filter 17 is used to spectrally filter the QKD encoded pulses 4 and the reference pulses 7 when a difference between the wavelength of the QKD encoded pulses 4 and the wavelength of the reference pulses 7 is between 1 nm and 5 nm, preferably between 2 nm and 3 nm. This wavelength difference makes it possible to further isolate the QKD encoded pulses 4 and the reference pulses 7.

Figure 8:
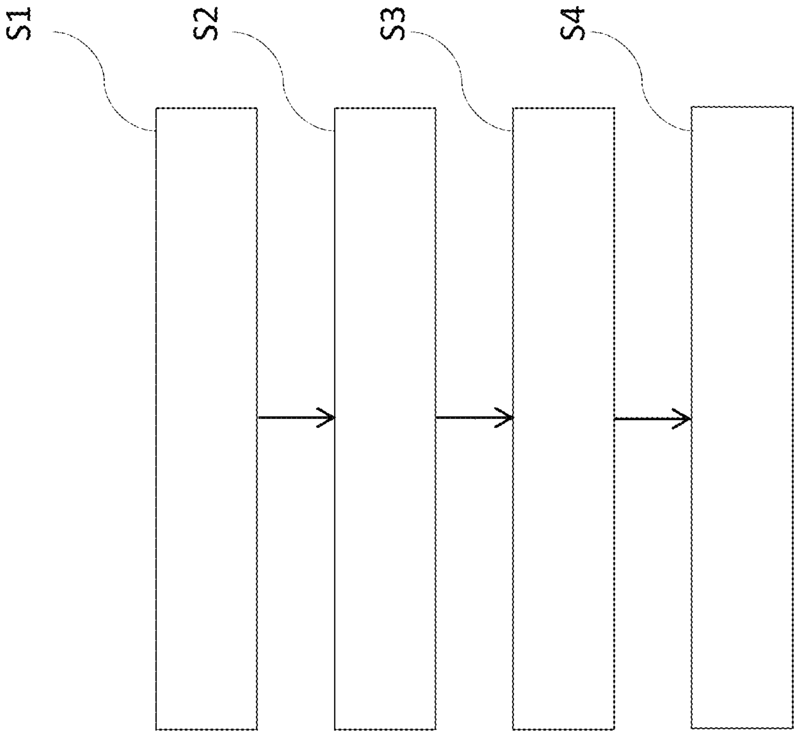
FIG. 8 shows a schematic illustration of a method for quantum communication according to an embodiment of the invention.

FIG. 8 shows a schematic illustration of a method for quantum communication according to an embodiment of the invention.

FIG. 8 shows a method for quantum communication. The method comprises the step of emitting S1, by an optical transmitter 1, a stream of QKD encoded pulses 4 and reference pulses 7, wherein the reference pulses 7 are emitted with a predetermined time delay T to the preceding QKD encoded pulses 4. A difference of a wavelength of the QKD encoded pulses 4 and a wavelength of the reference pulses 7 is 5 nm or less. The method further comprises measuring S2, by a wavefront sensor 12, the wavefront 13 of the reference pulses 7. An additional step of applying S3 based on the measured wavefront 13 a wavefront correction to the QKD encoded pulses 4 by an adaptive optical element 14 is provided. The method further includes the step of obtaining S4, by a detection unit 11 containing one or more photon counters, the QKD encoded pulses 4 by applying a time gate G based on a time of arrival of the QKD encoded pulses 4 to the one or more photon counters in the detection unit 11 for temporally filtering the QKD encoded pulses 4 from the reference pulses 7.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments.

Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms “including” and “having” are used as neutral linguistic concepts for the corresponding terms “comprising”.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 optical transmitter
2, 2*a*-2*d* QKD channel
3 QKD light source
4 QKD encoded pulse
5 reference channel
6 reference light source
7 reference pulse
8 control circuit
10 optical receiver
11 detection unit
12 wavefront sensor
13 wavefront of a reference pulse
14 adaptive optical element
15 wavefront of a QKD encoded pulse
16 receiver controller
17 dichroic filter
20 optical system
21 output beam
22 atmosphere
40 time/distance axis
50 power supply
51 pulse generator
52 internal clock
53 driver
54 QKD delay line
55 reference delay line
56 synchronized current pulse
57 current reference pulse
58 polarizer
59 amplitude modulator
60 fiber optics
61 fiber coupling optics
62 optical fiber
63 fiber coupler
64 fiber collimator
65 mirror
66 beam combiner
70 spatial mode converter
71 spatial demultiplexer
72 spatial mode of the reference pulses
73 spatial mode of the QKD encoded pulses
A optical axis
G time gate P time period of the emitted pulses
T predetermined time delay
R, R1, R2 receiver channels
W width of the time gate
$W_{QKD}$ pulse width of a QKD encoded pulse
S1-S4 Method steps

The invention claimed is:

1. An optical transmitter for quantum communication, comprising:

a QKD channel comprising at least one QKD light source and configured to emit a stream of QKD encoded pulses;

a reference channel comprising a reference light source and configured to emit a stream of reference pulses, wherein the reference light source is distinct from and not optically derived from the at least one QKD light source; and a control circuit connected to the QKD channel and to the reference light channel, wherein the control circuit is configured to control the QKD channel and the reference channel to emit the reference pulses with a predetermined time delay to the QKD encoded pulses and to control the predetermined time delay to correspond to an expected arrival time of the QKD encoded pulses at a receiver, wherein the reference pulses are generated independently of the QKD encoded pulses and are configured to enable wavefront sensing and adaptive correction prior to detection of the QKD encoded pulses at the receiver, and wherein a difference of a wavelength of the QKD encoded pulses and a wavelength of the reference pulses is 5 nm or less.

2. The optical transmitter according to claim 1, wherein the control circuit comprises a pulse generator, and wherein the control circuit is configured to drive the reference light source by pulses generated by the pulse generator.

3. The optical transmitter according to claim 1, further comprising an amplitude modulator connected to the control circuit, wherein the reference light source is configured as a cw light source, wherein the amplitude modulator is arranged in the reference channel and configured to modulate emitted light of the reference light source to generate the reference pulses.

4. The optical transmitter according to claim 1, wherein the control circuit comprises a reference delay line configured to delay an electric signal to the reference channel to generate the predetermined time delay.

5. The optical transmitter according to claim 1, further comprising a spatial mode converter, which is configured to modulate a spatial mode of at least one of the QKD encoded pulses or the reference pulses.

6. The optical transmitter according to claim 1, further comprising combiner optics arranged and configured to combine the QKD encoded pulses and the reference pulses to a combined output beam.

7. The optical transmitter according to claim 1, wherein the QKD channel comprises a plurality of QKD light sources, which are configured as single photon sources.

8. The optical transmitter according to claim 7, wherein the control circuit comprises a QKD delay line for each of the QKD light sources, and wherein the control circuit is configured to trigger the plurality of QKD light sources to substantially emit QKD encoded pulses simultaneously.

9. The optical transmitter according to claim 1, wherein the predetermined time delay is approximately half of a time period of two successive QKD encoded pulses.

10. The optical transmitter according claim 1, wherein the control circuit comprises an internal clock, wherein the internal clock is configured to provide a time base for the predetermined time delay of the QKD encoded pulses and the reference pulses.

11. An optical receiver for quantum communication, comprising:

a detection unit containing one or more photon counters arranged and configured to detect QKD encoded pulses emitted by the optical transmitter according to claim 1;

a wavefront sensor arranged to receive reference pulses emitted by the optical transmitter, and configured to measure a wavefront of the reference pulses to provide a wavefront signal;

an adaptive optical element arranged upstream of the detection unit and configured to manipulate a wavefront of the QKD encoded pulses; and a receiver controller connected to the wavefront sensor, the adaptive optical element and the detection unit, wherein the receiver controller is configured to:

apply a time gate to the one or more photon counters in the detection unit at a time of arrival of the QKD encoded pulses;

obtain the wavefront signal indicating the measured wavefront of the reference pulses; and trigger the adaptive optical element to correct the wavefront of the QKD encoded pulses based on the wavefront signal, wherein the receiver controller is configured to apply the time gate after correction of the wavefront of the QKD encoded pulses by the adaptive optical element.

12. The optical receiver according to claim 11, further comprising a dichroic filter, wherein the dichroic filter is arranged and configured to substantially spectrally filter the QKD encoded pulses from the reference pulses when a difference between the wavelength of the QKD encoded pulses and the wavelength of the reference pulses is between 1 nm and 5 nm.

13. The optical receiver according to claim 12, wherein the wavelength of the reference pulses is between 2 nm and 3 nm.

14. The optical receiver according to claim 11, wherein the adaptive optical element is arranged upstream of the wavefront sensor and configured to manipulate the wavefront of the reference pulses, and wherein the receiver controller is configured to correct a spatial mode of the reference pulses based on the measured wavefront.

15. An optical system for quantum communication comprising:

an optical transmitter, including:

a QKD channel configured to emit QKD encoded pulses, and a reference channel configured to emit reference pulses; and an optical receiver according to claim 11, wherein the optical transmitter is configured to emit the reference pulses with a predetermined time delay relative to the QKD encoded pulses to enable, at the optical receiver, wavefront sensing and adaptive optical correction prior to time-gated detection of the QKD encoded pulses.

16. A method for quantum communication, comprising:

emitting, by an optical transmitter, a stream of QKD encoded pulses and reference pulses, wherein the reference pulses are emitted with a predetermined time delay to the QKD encoded pulses, wherein a difference of a wavelength of the QKD encoded pulses and a wavelength of the reference pulses is 5 nm or less;

measuring, by a wavefront sensor, a wavefront of the reference pulses;

applying, based on the measured wavefront, a wavefront correction to the QKD encoded pulses by an adaptive optical element; and obtaining, by a detection unit containing one or more photon counters, the QKD encoded pulses by applying a time gate based on a time of arrival of the QKD encoded pulses at the one or more photon counters in the detection unit for temporally filtering the QKD encoded pulses from the reference pulses.

* * * * *